April 11, 1961 D. M. PUTNAM 2,979,364
PNEUMATIC SIGNALLING SYSTEM FOR TRACTOR-TRAILER COMBINATIONS
Filed Dec. 5, 1958 3 Sheets-Sheet 1
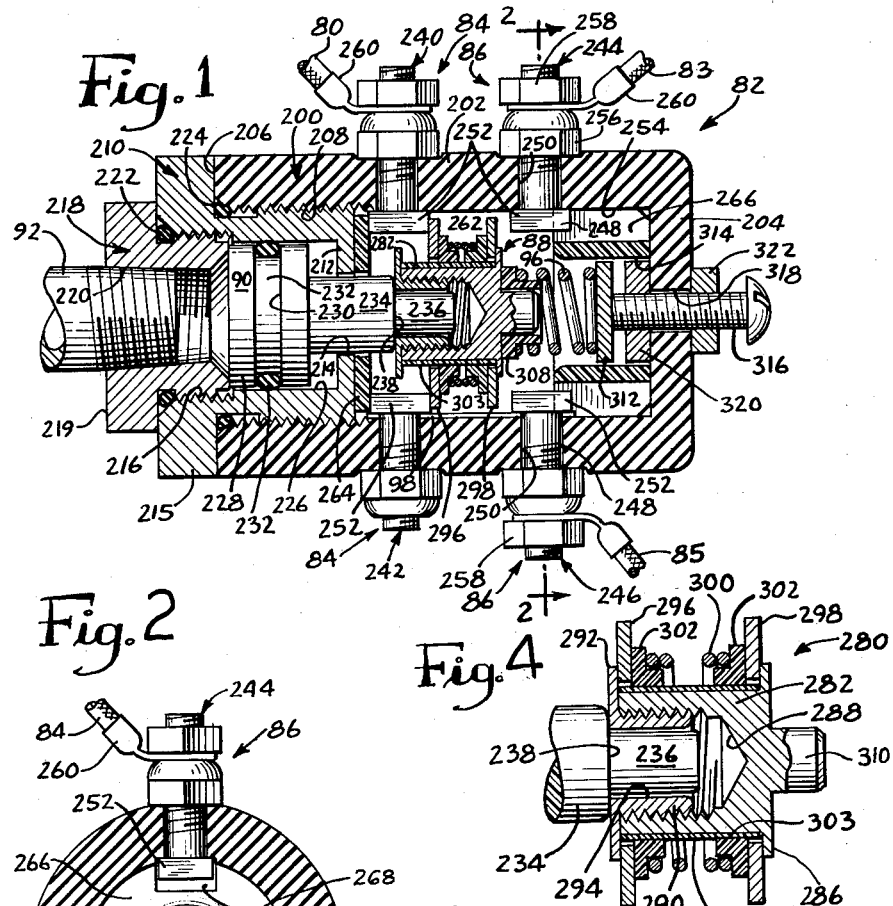
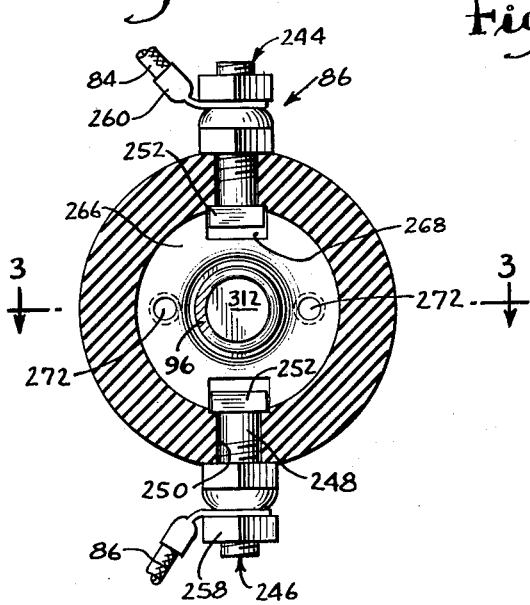
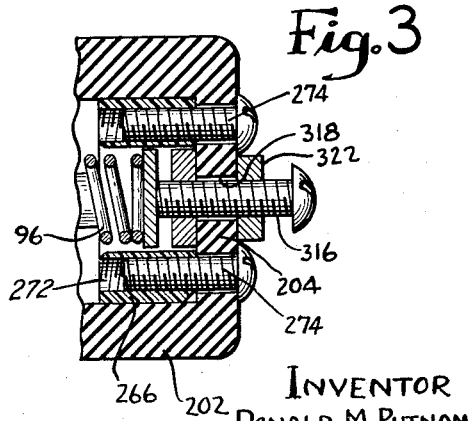
INVENTOR
DONALD M. PUTNAM
by: Norman Gerlach
ATTY.

April 11, 1961   D. M. PUTNAM   2,979,364
PNEUMATIC SIGNALLING SYSTEM FOR TRACTOR-TRAILER COMBINATIONS
Filed Dec. 5, 1958   3 Sheets-Sheet 2

INVENTOR
DONALD M. PUTNAM

ATTY.

INVENTOR
DONALD M. PUTNAM
ATTY.

United States Patent Office 2,979,364
Patented Apr. 11, 1961

2,979,364
PNEUMATIC SIGNALLING SYSTEM FOR TRACTOR-TRAILER COMBINATIONS

Donald M. Putnam, Chicago, Ill., assignor to Power Brake Parts Mfg. Co., Chicago, Ill., a corporation of Illinois Filed Dec. 5, 1958, Ser. No. 778,505

3 Claims. (Cl. 303—1)

The present invention relates to pneumatic braking apparatus for tractor-trailer combinations and more particularly to a signalling system for such braking apparatus whereby when any contingency arises in connection with the operation of the braking apparatus which results in a loss of pressure within the trailer emergency line, whether it be caused by an emergency break-away, a voluntary disconnecting of the trailer, or a slow leak in the braking system, signalling circuits will become energized whereby both the driver of the tractor and the driver of any vehicle approaching the trailer from the rear will become apprised of the emergency condition. The invention is also concerned with a novel form of pneumatically operable electric switch assembly or contact device which forms the subject matter of my copending application, Serial No. 8,059, filed February 11, 1960, for Control Switch for Pneumatic Braking Systems, and by means of which such signalling circuits may be energized under the control of air pressure conditions in the braking system.

The improved signalling system and switch assembly of the present invention have been designed for use primarily in connection with pneumatic braking apparatus of the type shown and described in my copending application, Serial No. 656,702, filed on May 2, 1957, and entitled "Pneumatic Braking System for Tractor-Trailer Combinations," and the invention has been illustrated herein as being applied to such apparatus. It will be understood, however, that the signalling system and switch of assembly of the present invention are applicable to all manner of pneumatic braking apparatus currently employed in connection with tractor-trailer combinations, the signalling system being susceptible to modification to accommodate the different types of apparatus and the switch assembly being useable in all installations with or without modification, as required.

It is among the principal objects of the present invention to provide a novel signalling system capable of being installed as original equipment in connection with various types of pneumatic braking systems for tractor-trailer combinations, or of being applied to existing systems and which, in either instance, will function automatically to energize the trailer stop-light signal lamp at such times as the air pressure within the trailer emergency line falls below a predetermined minimum, yet which does not interfere with the normal operation of the signal lamp under the control of the stop-light switch which, in turn, is operable under the control of the tractor brake pedal.

A still further object of the invention is to provide such a signalling system which, additionally, functions to energize a dash-mounted signal within the tractor cab when such loss of pressure takes place in the pneumatic brake control system.

Another object of the invention is to provide a signalling system of the general character briefly outlined above wherein, after the trailer has been disconnected from the tractor, the system is so conditioned that the tractor stop-light signal lamp will function in the usual manner under the control of the stop-light switch.

Another object of the invention is to provide such a signalling system wherein the conventional electrical circuits employed for actuating both the tractor stop-light signal lamp and the trailer stop-light signal lamp will remain effective so that these signal lamps will perform their normal function in an emergency during falling of the pressure in the system until after such time as the stop-light signal lamp on the trailer has become energized through the emergency circuit of the present system, thus assuring either normal stop-light operation or emergency stop-light operation at all times and obviating the possibility of a condition in which no current is available for stop-light operation.

It is another object of the invention to provide a signalling system for the pneumatic braking apparatus of tractor-trailer combinations and utilizing the pneumatically operable switch assembly of my above-mentioned copending application as a stop-light emergency switch in a novel manner in order to render a warning signal when the pressure within a selected region of the pneumatic brake control system falls below a predetermined degree.

Briefly, the switch assembly used in connection with the present signalling system involves in its general organization a generally cylindrical composite casing which is divided into two longitudinally spaced cylindrical chambers, one of the chambers constituting an operating cylinder for a piston and the other chamber constituting an operating chamber for the movable contact elements associated with the assembly. Suitably supported within the operating chamber at longitudinally spaced regions therealong are two pairs of spaced contacts and slidably disposed within the operating chamber between the two pairs of contacts is a spool-like contact bridging member which is selectively movable into and out of electrical engagement with the contacts of each pair. The bridge member is longitudinally expansible and contractible and is movable between a normal position wherein it is maintained, under the influence of spring pressure, in a contracted condition wherein it engages and electrically bridges the contacts of one pair while at the same time remaining out of bridging engagement with the contacts of the other pair, and an advanced position wherein it is compressed under the influence of high pneumatic pressure so that it engages and bridges the contacts of the other pair while at the same time remaining out of electrical contact with the contacts of the first pair. In an intermediate position between its normal and its advanced position, the bridge member is expanded or extended so that it engages and bridges the distance between the contacts of both pairs.

The signalling system of the present invention requires the use of circuitry capable of being operated by the above-outlined switch assembly or by circuit making and breaking apparatus capable of performing similar functions in the system.

Yet another object of the invention is to provide such a signalling system for the braking system of tractor-trailer combinations wherein the usual stop-light signal lamp for the trailer normally functions in the usual manner under the control of a conventional manual control valve, and wherein the above-mentioned switch assembly is so disposed in the signal lamp circuit that when air pressure conditions in the braking system fall below a predetermined minimum, an overriding control is imposed upon the signal lamp to illuminate it.

Other objects and advantages of the invention, not at this time enumerated, will become readily apparent as the following description ensues.

In the accompanying three sheets of drawings forming a part of this specification, one illustrative embodiment of the pneumatic signalling system of the present invention has been shown, together with two embodiments of a circuit making and breaking apparatus employed in connection with the system.

In these drawings:

Fig. 1 is a sectional view taken substantially longitudinally and centrally through a circuit making and breaking apparatus or assembly employed for effecting the electrical functions of the present signalling system, and showing the same operatively applied to a compressed air line under conditions of low air pressure;

Fig. 2 is a sectional view taken substantially along the line 2—2 of Fig. 1;

Fig. 3 is a sectional view taken substantially along the line 3—3 of Fig. 2;

Fig. 4 is an enlarged fragmentary sectional view of a portion of the structure shown in Fig. 1;

Figure 8:
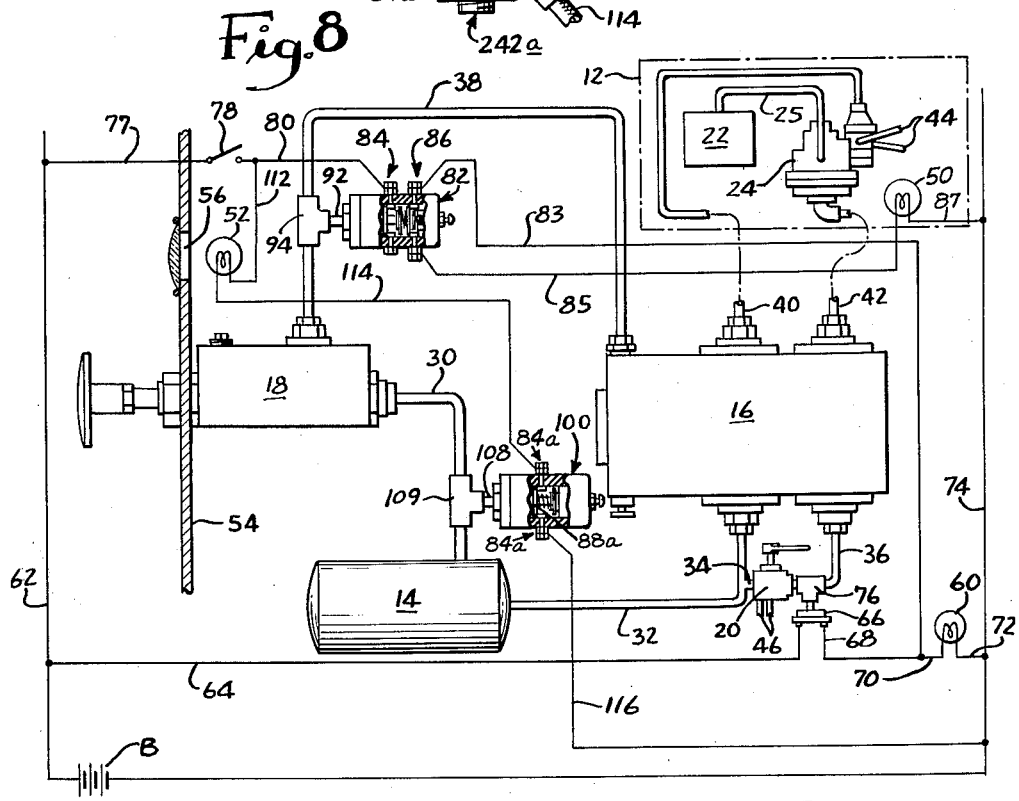
Fig. 8 is a schematic view of a pneumatic braking system for tractor-trailer combinations to which the signalling system of the present invention has been applied, the signalling system being illustrated in the form of a circuit diagram.

Referring now to the drawings in detail and in particular to Fig. 8 wherein a pneumatic braking system for tractor-trailer combinations has been shown with the signalling system of the present invention operatively applied thereto, the braking system selected for illustration in that which has been shown in my copending application Serial No. 656,702, filed on May 2, 1957, and entitled "Pneumatic Braking System for Tractor-Trailer Combinations." It will be understood, however, that the signalling system of the present invention is applicable to other forms of braking systems, the only requisite being that the apparatus to which the signalling system is applied be provided with the usual tractor pressure tank and its associated emergency valve assembly.

The braking system illustrated herein has been schematically shown, the trailer being represented by the dotted rectangle 12 and the tractor constituting the remainder of the structure shown in Fig. 8. The tractor-mounted mechanism of the braking apparatus includes the usual compressed air tank 14, hereinafter referred to as the tractor pressure tank; a combined emergency and service valve assembly 16; and a control valve assembly 18 which is mounted on the tractor instrument panel where it is conveniently available for manual operation; and a master brake-actuating valve assembly 20 which is of the manually operable type. The trailer-mounted mechanism consists of the conventional trailer pressure tank or reservoir 22 and a relay or emergency application valve 24 connected thereto by a line 25 and which, as required by the law of most states, supplies air to the trailer brakes from the pressure tank 22 to apply the brakes in the event of a break-away. The tractor pressure tank 14 is operatively connected to the control valve 18 through a conduit 30 and it is also connected to the emergency valve structure of the valve assembly 16 through a conduit 32 having a branch line 34 leading to the brake control valve 20. This latter valve 20 is operatively connected through a conduit 36 to the service valve structure of the valve assembly 16. The control valve 18 and combined emergency and service valve assembly 16 are operatively connected by a conduit 38. Emergency and service lines 40 and 42, respectively, extend from the valve assembly 16 to the valve structure 24 associated with the trailer-mounted mechanism 12. Trailer brake lines 44 extend from the valve structure 24 and the tractor brake lines 46 extend from the brake control valve 20.

The details of the control valve 18 and combined service and emergency valve assembly 16 have not been disclosed herein and reference may be had to my abovementioned copending application for a full understanding of the nature and operation of these valve structures. It is deemed sufficient for purposes of illustration herein to state that the control valve 18 may be manipulated initially to charge the trailer pressure tank 22 with air under pressure from the tractor pressure tank 14 and to actuate the service side of the valve assembly 16 and condition the system in such a manner that the brake control valve 20 may be operated to simultaneously apply both the tractor and the trailer brakes. After the control valve 18 has been manually operated for initial charging of the trailer pressure tank 22, the system becomes automatically effective so that the tractor and trailer may become separated by an intentional disconnecting of the trailer, or by an unintentional or "emergency" break-away, with or without damage to or rupture of the connecting air line or either one of them while the pressure existing within both the tractor pressure tank 14 and the trailer pressure tank 22 is conserved without appreciable loss of air so that in any event air under full tank pressure is available for operation of the tractor brakes and for automatic application of the trailer brakes under the influence of the emergency application valve 24. Additionally, in the event of a leak in the system at any point on either side of the control valve 18, means are provided whereby when the pressure within the system drops below a predetermined minimum, the remaining pressure of air within the tractor pressure tank 14 will be conserved, this pressure being sufficient for satisfactory operation of the tractor brake, while the relay valve 24 is relied upon to apply the trailer brakes automatically.

According to the present invention, the above-described braking apparatus is capable of having applied thereto without appreciable modification of the apparatus the novel signalling system of the present invention, this signalling system being effective when any contingency arises in connection with the operation of the braking apparatus which results in a loss of pressure within the conduit 38, whether it be caused by an emergency breakaway, a voluntary disconnecting of the trailer, or a slow leak in the system to energize a first signalling circuit including the trailer stop-light signalling lamp 50. The signalling system is also effective whenever the pressure existing within the conduit 30 leading from the tractor pressure tank 14 falls below a predetermined minimum to energize a second signalling circuit including a warning signal lamp 52, the latter being preferably positioned within the tractor cab behind the usual instrument panel 54 and being visible through an opening 56 provided in the panel 54.

Still referring to Fig. 8, the electrical circuits of the present signalling system are adapted to be energized from a source of electrical current such as the battery B which may be the usual power supply battery of the tractor. The tractor stop-light signal lamp 60 is disposed in an electrical circuit leading from the positive side 62 of the line through a lead 64, the usual stop-light switch 66, leads 68 and 70, signal lamp 60 and leads 72 to the negative side 74 of the line. The stop-light switch 66 is conventional in its design and is operatively connected to a T-fitting 76 which is interposed in the conduit 36 so that when the brake control switch 20 is actuated to admit air to the conduit 36, the pressure of air within the conduit 36 will be applied to the switch 66 to establish communication between the leads 64 and 68 and thus complete an electrical circuit through the signal lamp 60.

The stop-light signal lamp 60 is thus operable in the usual manner under the control of the valve 20. According to the present invention, the signal lamp 60 is also disposed in an electrical circuit extending from the line 62 through lead 77, the tractor ignition switch 78, lead 80, an emergency trailer stop-light switch schematically shown in Fig. 8 and designated at 82, leads 83, 70, signal lamp 60 and lead 72 to the line 74. The trailer signal lamp 50 is disposed in an electrcial circuit extending from the line 62 through lead 77, ignition switch 78, lead 80, switch assembly 82, lead 85, signal lamp 50 and lead 87 to the line 74.

Figure 6:
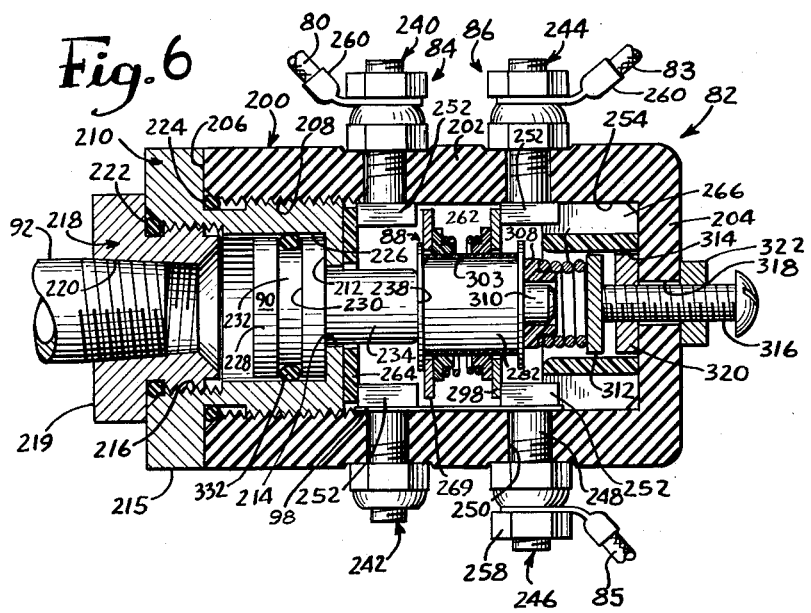
Fig. 6 is a sectional view similar to Figs. 1 and 3 showing the parts in the positions which they assume under conditions of high pressure.
Figure 5:
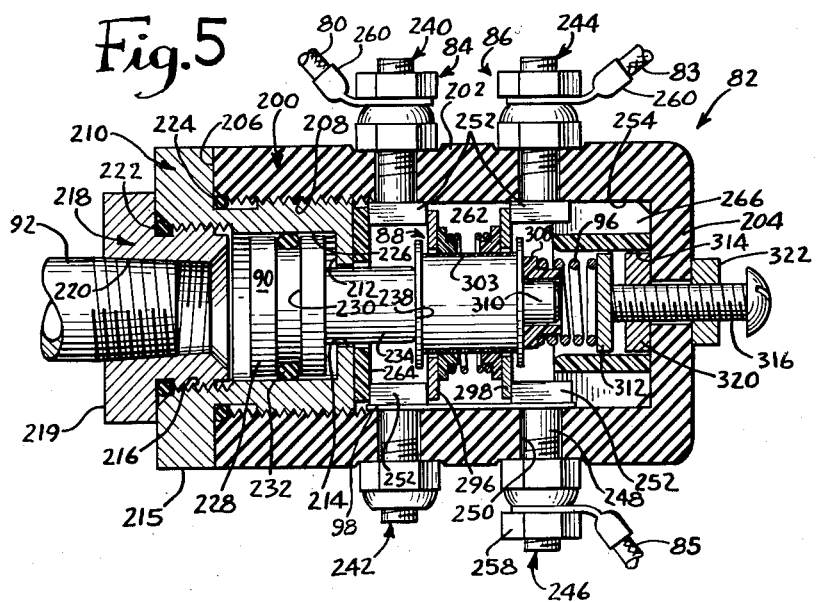
Fig. 5 is a sectional view similar to Fig. 1 showing the parts in the position which they assume under conditions of intermediate air pressure.

The constructional details of the emergency trailer stop-light switch 82 will be set forth in detail presently, it being deemed sufficient for an understanding of the signalling system of the present invention to point out that this switch 82 is of the dual contact reversible bridge type wherein two pairs of fixed separated contacts are adapted to be selectively bridged by a movable bridge member disposed between them, the bridge member when moving in either direction between two extreme positions, serving to engage one of the pair of contacts before it disengages the other pair of contacts so that when the bridge member is in an intermediate position, both pairs of contacts are bridged. Functionally, dual contact switch assemblies with overlapping bridge elements are not new and this type of circuit making and breaking apparatus has been schematically illustrated in Fig. 8 wherein the two pairs of contacts are designated at 84 and 86, respectively, these contacts having associated therewith a sliding bridge member 88 which is movable from the position wherein it is shown in Fig. 1 in bridging relationship with respect to the contacts 84, through an intermediate position wherein it bridges both pairs of contacts 84 and 86 as shown in Fig. 5, to the dotted line position wherein it bridges only the contacts 86 as shown in Fig. 6. The bridge member 88 is operatively connected to a piston and cylinder device 90 having communication through a conduit section 92 with the interior of the conduit 38 (see Fig. 8) by means of a T-fitting 94 which is interposed in the conduit 38. A spring 96 normally maintains the bridge member 88 in the position shown in Fig. 1, but when the air pressure within the conduit 38 exceeds a predetermined minimum, the spring pressure is opposed so that the bridge member 88 is moved through the position shown in Fig. 5, to the position shown in Fig. 6. A connector strip 98 establishes communication between one of the pair of contacts 84 and one of the pair of contacts 86.

One of the contacts 84 is electrically connected to the lead 80, the other contact 84 being electrically connected to the strip 98. One of the contacts 86 is electrically connected to the lead 83 while the other contact 86 is electrically connected to both the connector strip 98 and the lead 85. It will be seen, therefore, that when the ignition switch 78 is closed and the pressure within the conduit 38 is above a predetermined minimum, for example, the full line pressure for which the pneumatic system is designed, the pair of contacts 86 will be bridged while the pair of contacts 84 will be electrically disconnected. Upon manipulation of the brake control valve 20 to admit air to the line 36, the stop-light switch 66 will be actuated so that a circuit will extend from the line 62 through lead 64, stop-light switch 66, leads 68, 83, contacts 86, lead 85, stop-light signal lamp 50, and lead 87 to the line 74. At the same time a parallel circuit will extend from the line 62 through lead 64, stop-light switch 66, leads 68, 70, tractor signal lamp 60 and lead 72 to the line 74. Thus, with the contacts 86 bridged by the member 88, normal stop-light operation for both the tractor and the trailer is available. In the event the pressure within the conduit 38 falls below the predetermined minimum for any reason whatsoever as, for example, a break-away or a slow leak in the system, the compressional force of the spring 96 will be unopposed by the piston and cylinder arrangement 90 so that the bridge member 88 will first bridge the contacts 84 and thereafter release the contacts 86 whereupon a circuit extending from the line 62 through lead 77, ignition switch 78, lead 80, contacts 84, connector strip 98, lead 85, trailer stop-light signal lamp 50, and lead 87 to the line 74 will be established. As long as the pressure in the system remains at this low point, the signal lamp 50 will be illuminated. At the same time, a circuit will exist from the line 62 through lead 77, ignition switch 78, lead 80, contacts 84, connector strip 98, contact 86, leads 83, 70, trailer stop-light signal lamp 60 and lead 72 to the line 74. The trailer stop-light will thus be simultaneously illuminated with the tractor stop-light signal lamp. Such illumination of both signal lamps 50 and 60 will, of course, render the valve controlled stop-light switch 66 ineffective.

In order to energize the signal lamp 52 on the instrument panel 54 when the pressure within the tank 14 falls below a predetermined minimum and thus render a visual warning signal to the operator of the trailer, a modified form of pressure actuated switch assembly 100 is provided, this switch assembly being schematically illustrated in Fig. 8, and in detail in Fig. 7. Briefly, this switch assembly is in the form of a circuit making and breaking apparatus including a single pair of fixed contacts 84a adapted to be selectively engaged and disengaged by a bridge member 88a, the latter being operable under the control of a piston and cylinder assembly 90a operatively connected by means of a conduit section 108 to the interior of a T-fitting 109 interposed in the conduit section 30 leading from the pressure tank 14. The bridge member 298a is normally maintained in its bridging position under the influence of a compression spring 96a which forces the member toward the pair of contacts 84a. The compression spring 96a is opposed by the piston and cylinder arrangement 90a so that when the pressure with the tank 14 exceeds a predetermined minimum, the compressional force of the spring 96a is overcome and the pair of contacts 84a remain electrically separated from each other. However, when the pressure within the tank 14 falls below the predetermined minimum, the action of the spring 96a is unopposed and the latter serves to force the bridge member 298a into engagement with the contacts 84a to electrically connect the same. Under such conditions, a circuit will extend from the line 62 through the lead 77, ignition switch 78, line 112, signal lamp 52, lead 114, contacts 84a and lead 116 to the line 74. The nature of the switch 100 will be described in greater detail presently.

Referring now to Figs. 1 to 4, inclusive, wherein a pneumatically operable circuit making and breaking apparatus constructed in accordance with the principles of the present invention and capable of being employed as an emergency trailer stop-light switch in the signalling system of the present invention has been illustrated in detail, this switch assembly 82 involves in its general organization a relatively deep, thick wall, outer switch casing 200 having a cylindrical wall 202, a circular end wall 204 and an open rim 206. The open end region of the casing 200 is interiorly threaded as at 208 for threaded reception therein of a generally cup-shaped cylinder unit 210 having a circular end wall 212 provided with a central opening 214 therethrough. The open end of the cylinder unit 210 is provided with a radial flange 215 which may be of hexagonal contour for reception thereover of a suitable tool such as a wrench, and the flange 215 is adapted to bear against the open rim 206 of the casing 200 when the cylinder unit 210 is in its home position within the unit. The open end of the cylinder unit 210 is interiorly threaded as at 216 for threaded reception therein of a nipple or fitting 218 having a hexagonal head portion 219 and provided with an internally threaded bore 220 for reception therein of one end of a suitable pressure line such as the conduit 92 employed in connection with the previously described pneumatic signalling system. A resilient O-ring 222 functions as a gasket for effecting a seal between the cylinder unit 210 and nipple 218 while a similar O-ring 224 functions as a gasket for effecting a seal between the casing 200 and the cylinder unit 210. The cylinder unit 210 is formed with an internal cylindrical bore 226 in which there is slidably disposed a piston 228 which is exteriorly grooved as at 230 for reception therein of a piston ring in the form of a resilient O-ring 232. The cylinder 228 is formed with a stem 234 having a reduced end 236 affording an annular shoulder 238. The stem 234 projects outwardly of the cylinder unit 210 through the opening 214 with a close fit, the piston and stem being slidable longitudinally of the valve casing 200 within the bore 226. The piston 228 and its stem 234 are preferably formed of a suitable insulating material, preferably of a plastic nature such as Bakelite or any one of a large number of available synthetic resins such as polyethylene or the like.

Projecting radially through the cylindrical wall 202 of the casing 200 are a series of four contact assemblies 240, 242, 244, and 246, respectively, the assemblies being arranged in diametrically disposed pairs. Each assembly is in the form of a bolt-like element having a threaded shank portion 248 projecting through an opening 250 in the wall 202 and a square head portion 252 which bears against the inner cylindrical surface 254 of the wall 202. A nut 256 is received on each shank 248 for securing the contact assembly in position on the wall 202 and a clamping nut 258 is provided for the purpose of maintaining the terminal ends 260 of a series of conductors such as the conductors 80, 83 and 85 (Fig. 8) in electrical engagement with the various contact assemblies. The heads 252 of the assemblies 240 and 242 assume diametrically opposed positions within the contact-enclosing chamber 262 and these two heads constitute, in effect, the previously mentioned pair of contacts 84. Similarly, the heads 252 of the assembly 244 and 246 are diametrically disposed across the chamber 262 and constitute in effect the previously mentioned pair of contacts 86. It is essential that the various contact assemblies 240, 242, 244 and 246 be secured in position on the wall 202 in such a manner that the square head portions 252 have their side edges extending longitudinally of the casing 200. Accordingly, a disc or washer 264, likewise formed of insulating material, surrounds the stem 234 and is adapted to have its extreme peripheral edge regions clamped between the end wall 212 of the cylindrical unit 210 and one flat side of each of the square heads 252 of the contact assemblies 240 and 242. In order to properly orient the square head portions 252 of the contact assemblies 244 and 246 with the side surfaces thereof extending longitudinally of the casing 200, a ring member 266 (see Figs. 2 and 3) is nested within the deep end of the bore 254 and is formed with a pair of longiutdinally extending peripheral slots 268 which embrace limited regions of the heads 252. The ring member 266 is formed of a suitable insulating plastic material and it is formed with a pair of diametrically opposed threaded bores 272 (Fig. 3) designed for threaded reception therein of a pair of anchoring screws 274 which project through the casing end wall 204 and serve to maintain the ring 266 seated and in face-to-face contact with the inside surface of the wall 204.

Mounted on the reduced end 236 of the piston stem 234 and movable longitudinally in opposite directions within the chamber 262, and operative between the two pairs of contacts 84 and 86 is the previously mentioned composite contact-bridging assembly 88 (shown in detail in Fig. 4) and including a core member 282 having a cylindrical spool surface 284 and a radial flange 286 at one end thereof. The core member 282 is provided with a threaded socket 288 in one end thereof in which there is threadedly received a cap member 290 provided with a radial flange 292. The cap member 290 is formed with a central bore 294 therethrough which receives therein the reduced end 236 of the piston stem 234. The cap member 290, when received on the reduced portion 236 of the stem 234, is adapted to bear against the shoulder 238. Slidably and floatingly disposed on the cylindrical portion 284 of the spool core 282 are a pair of contact bridging rings proper 296 and 298, respectively, these rings being disposed at opposite ends of the spool and being normally urged or spread apart by means of a compression spring 300 which is interposed between the rings and insulated therefrom by means of insulating washers 302 formed of a suitable plastic material. A sleeve 303 of insulating material insulates the rings 296 and 298 from the core 282. The rings 296 and 298 are thus normally urged apart and into engagement with the respective flanges 292 and 286 of the spool assembly. The purpose of insulating the spring 300 from the contact bridging rings 296 and 298 is to maintain the spring free from the flow of any electric current therethrough which, due to the ohmic resistance of the spring, might tend to cause heating thereof with a consequent loss of spring tension.

In order to maintain the spool assembly 88 seated on the shoulder 238 provided at the base of the reduced cylindrical portion 236 of the piston stem 234, the compression spring 96 bears at one end against an insulating washer 308 which is telescopically received over a post 310 provided on the end of the spool body 282 adjacent the flange 286 (Fig. 4). The other end of the spring bears against an insulating disc 312 which is slidable within the central bore 314 provided in the ring member 266 and which is adapted to bear against the inner end of an adjusting screw 316 which passes through an opening 318 provided in the end wall 204 of the casing 200 and which also passes through and has threaded engagement with a circular nut 320 frictionally retained within the bore 314. A locking nut 322 serves to secure the adjusting screw 316 in any desired position of adjustment. The washer 308 and disc 312 serve to insulate the spring 306 from the electrical components of the switch assembly. The previously described connector strip 98 underlies the square contact heads 252 of the contact assemblies 242 and 246 and electrically connects these two assemblies.

It is to be noted that in the normal or free condition of the various parts of the above described switch assembly 82, the compressional force applied by the spring 96 against the spool assembly 88 is sufficiently great as to overcome the compressional force exerted by the spring 300 so that the spool assembly as a whole is forced to the left as viewed in Fig. 1 and the contact ring 296 is maintained in electrical bridging engagement with the square contact heads 252 of the assemblies 240 and 242, respectively, while the contact bridging ring 298 is forced away from the flange 286 so that it remains out of contact with the square contact heads 252 of the assemblies 244 and 246. Thus, in the normal condition of the switch assembly 82, the contact assemblies 240 and 242 remain electrically connected together while the contact assemblies 244 and 246 are insulated from each other. The contact assemblies 242 and 246 are electrically connected together by virtue of the contact strip 98.

When the switch assembly 82 is operatively installed in the control system of Fig. 8, and the air pressure within the conduit section 92 is below a predetermined minimum, the three contact assemblies 240, 242 and 246 are electrically connected together while the contact assembly 244 is insulated from the other contact assemblies. As the pressure rises within the conduit 92, the piston 228 will move forwardly in the bore 226 in the cylinder unit 210 and the shoulder 238 provided on the piston stem 234 will force the spool member or core 282 to the right as viewed in Fig. 1. Thus, causing the compression spring 300 to urge the ring 298 forwardly so that this ring will move bodily with the core member until such time as it engages the transverse sides of the square contact heads 252 associated with the assemblies 244 and 246. For a brief interval of time during the forward motion of the piston 228, the contact ring 298 will engage the contact assemblies 244 and 246, while, simultaneously, the contact ring 296 will engage the contact assembly 240 and 242. If the connector strip 96 is employed, all four of the contact elements 240, 242, 244 and 246 will be in electrical engagement at this point. As the pressure within the conduit section 92 continues to rise above the predetermined minimum, the shoulder 238 will force the spool body 282 still further to the right as viewed in Fig. 1 so that the flange 286 on the spool body 282 will move away from the contact ring 298 while the flange 292 will move into engagement with the contact ring 296 and force the latter away from its bridging engagement with the contact assembly 240 and 242. Thus, when full line pressure has been attained within the conduit 92, the contact assemblies 244 and 246 will be electrically bridged while the contact assemblies 240 and 242 will be electrically isolated from each other. If the connector strip 96 is employed at full line pressure, the contact assembly 242, 244 and 246 will become electrically connected together.

Figure 7:
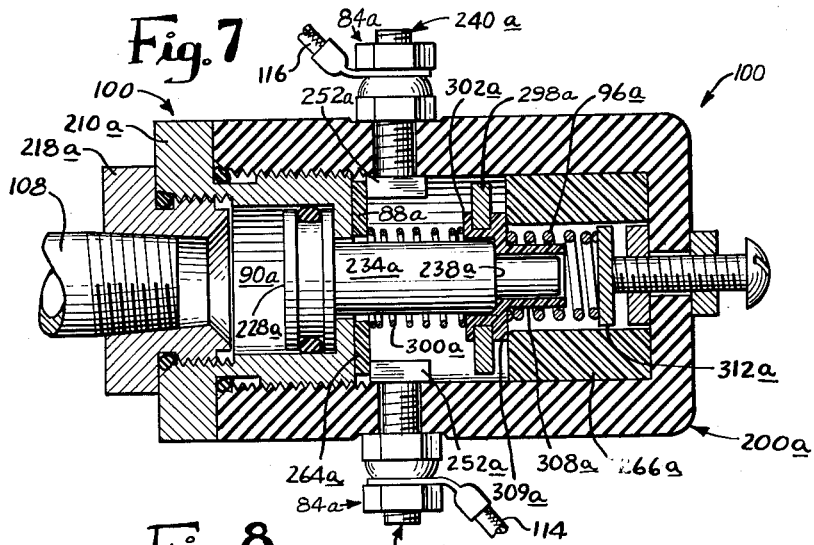
Fig. 7 is a sectional view similar to Fig. 1 showing a modified form of circuit making and breaking apparatus.

Referring now to Fig. 7 wherein a modified form of switch assembly, specifically the switch assembly 100 employed in connection with the signalling system of Fig. 8, has been illustrated in detail, this assembly is similar in many respects to the previously described switch assembly 82 and in order to avoid needless repetition of description, identical reference numerals but bearing the suffix "a" have been applied to the parts in Fig. 7 which correspond to identical parts in Fig. 1. The switch housing 200a, the cylinder unit 210a, the piston 228a and its stem 234a and the nipple 218a remain substantially the same as in the previously described form of the invention. The casing 200a is provided with but one pair of opposed contact assemblies 240a and 242a, respectively, these assemblies being identical with the assemblies 240 and 242 and including square contact heads 252a. In place of the composite spool-like contact bridge assembly 88, a single contact bridging ring 298a is employed. The bridging ring 298a is maintained insulated from the stem 234a by means of an insulating ring 302a through which the stem 234a passes. The shoulder 238a provided on the stem 234a bears against a sleeve 308a which is telescopically received on the reduced end 236a of the stem 234a and having a radial flange 309a which bears against one side of the contact ring 298a. A compression spring 300a bears at one end against the insulating washer 264a and at the other end against the insulating ring 302a and normally urges the bridging contact 298a to the right as viewed in Fig. 7. A spring 96a of greater compressional force than the spring 300a bears at one end against the flange 309a of the sleeve 308a and at its other end against the floating disc 312a so that the contact ring 298a is normally maintained in electrical contact with the two square contact heads 252a on the contact assemblies 240a and 242a, respectively. Otherwise, the details of the switch assembly 100 remain substantially the same as the details of the switch assembly 82.

In the operation of the switch assembly 100, when the pressure within the conduit section 108 remains below a predetermined minimum, the compressional force of the spring 96a overcomes the compressional force of the spring 300a so that the bridging contact ring 298a normally is in engagement with the contact assemblies 240a and 242a. When the pressure within the line 108 exceeds the predetermined minimum, the piston 228a moves to the right as viewed in Fig. 7 and the shoulder 238a which bears against the end of the sleeve 308a serves to move the sleeve to the right, thus compressing the spring 96a and allowing the spring 300a to force the insulating ring 302a, and consequently, the bridging contact ring 298a, away from the contact assemblies 240a and 242a. As the pressure within the conduit section 108 decreases, a reverse operation takes place and the contact ring 298a is restored to its normal position of engagement with the square contact heads 252a on the assemblies 240a and 242a. It is to be noted that both of the springs 300a and 96a are electrically insulated from the electrical components of the switch assembly so that they are not subjected to the flow of current therethrough, which, due to the ohmic resistance of these springs, might otherwise cause them to become heated to such an extent that the resiliency of the springs would be destroyed.

It is to be noted that in connection with both the switch assemblies 82 and 100 described above, the various contact bridging members are self-aligning and self-compensating for wear. Due to the relatively heavy flow of current through the contact assemblies when the switch assemblies are employed in signalling systems such as that illustrated in Fig. 8 repetitive arcing at the various contacts may in time cause an appreciable amount of contact deterioration so that the contacts become "worn." Despite this, the contact rings 296, 298 and 298a are self-aligning against the square contact heads 252 and 252a due to the fact that an appreciable clearance is provided at the central opening provided in these contact rings. Although one contact head 252 may become worn faster than a counterpart contact head, cocking of the various contact rings employed in connection with the present invention as a consequence of such uneven wear will not destroy the effective contact between the contact rings and the various contact heads with which they are associated.

The invention is not to be limited to the exact arrangement of parts shown in the accompanying drawings or described in this specification since various changes in the details of construction may be resorted to without departing from the spirit of the invention. Only insofar as the invention has been particularly pointed out in the accompanying claims is the same to be limited.

Having thus described the invention what I claim as new and desire to secure by letters patent is:

1. In a braking apparatus for tractor-trailer combinations, pneumatically operable brakes for the trailer, a stop-light signal lamp mounted on the trailer, a pressure tank for air mounted on the tractor, an emergency line connected to the trailer brakes for operation of the latter, an emergency valve interposed between the emergency line and tractor pressure tank, a service line connected to the trailer brakes for operation of the latter, a service valve interposed between the service line and the tractor pressure tank, and a normally closed brake-operating valve interposed between said service valve and the tractor pressure tank for operation of the tractor and trailer brakes upon opening said brake-operating valve, of a signalling system for energizing said signal lamp during trailer brake application and at such times as the air pressure within said emergency line falls below a predetermined minimum, said signalling system comprising a first electric circuit for said signal lamp including a normally open stop-light switch and a pair of normally open contacts disposed in series in the circuit, said brake operating valve being operable upon opening thereof to close said stop-light switch, said contacts and switch, when closed, serving to energize said circuit and illuminate said signal lamp, a second electric circuit for said signal lamp including a pair of normally closed contacts, a source of current for said circuits, one contact of the normally closed pair being connected directly to said source and one contact of the normally open pair being connected directly to the signal lamp, means connecting the other contact of the normally closed pair to said one contact of the normally open pair whereby when said normally closed pair remain closed said first circuit will override said second circuit and maintain said signal lamp energized, and pressure responsive means operable when the air pressure in said emergency line exceeds a predetermined minimum to close said pair of normally open contacts and to open said pair of normally closed contacts.

2. In a pneumatic braking apparatus for tractor-trailer combinations, pneumatically operable brakes for the trailer, a stop-light signal lamp mounted on the trailer, a pressure tank for air mounted on the tractor, an emergency line connected to the trailer brakes for operation of the latter, an emergency valve interposed between the emergency line and tractor pressure tank, a service line connected to the trailer brakes for operation of the latter, a service valve interposed between the service line and the tractor pressure tank, a normally closed brake-operating valve interposed between said service valve and the tractor pressure tank for operation of the tractor and trailer brakes upon opening of said brake-operating valve, a signalling system for energizing said signal lamp during trailer brake application and at such times as the air pressure within said emergency line falls below a predetermined minimum, said signalling system comprising a first electric circuit for said signal lamp including a normally open stop-light switch and a pair of normally open contacts disposed in series in the circuit, said brake operating valve being operable upon opening thereof to close said stop-light switch, said contacts and switch, when closed, serving to energize said circuit and illuminate said signal lamp, a second electric circuit for said signal lamp including a pair of normally closed contacts, a source of current for said circuits, one contact of the normally closed pair being connected directly to said source and one contact of the normally open pair being connected directly to the signal lamp, means connecting the other contact of the normally closed pair to said one contact of the normally open pair whereby when said normally closed pair remain closed said first circuit will override said second circuit and maintain said signal lamp energized, and pressure responsive means operable when the air pressure in said emergency line exceeds a predetermined minimum to close said pair of normally open contacts while maintaining said pair of normally closed contacts closed, and to thereafter open said pair of normally closed contacts.

3. In a pneumatic braking apparatus for tractor-trailer combinations, the structure set forth in claim 2 including, additionally, a warning signal lamp mounted on the tractor, a third electric circuit for said warning signal lamp, a pair of normally closed contacts disposed in said third electric circuit, and pressure responsive means operable when the air pressure in said tractor pressure tank exceeds a predetermined minimum for opening said latter pair of normally closed contacts.

References Cited in the file of this patent

UNITED STATES PATENTS

| | | |
|---|---|---|
| 1,850,626 | Hukill | Mar. 22, 1932 |
| 2,228,631 | Kuiper | Jan. 14, 1941 |
| 2,859,296 | Neu | Nov. 4, 1958 |